Figure 1:
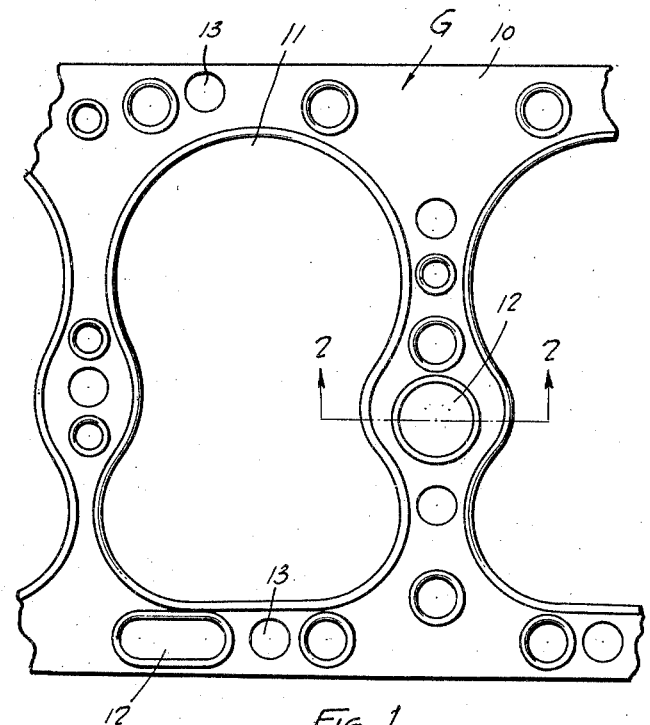

Nov. 1, 1938.                M. D. FITZGERALD                2,134,868
                                  GASKET
                            Filed Jan. 16, 1937            2 Sheets-Sheet 1

INVENTOR.
MARTIN D. FITZGERALD.
BY Joshua R. H. Potts
ATTORNEY.

Nov. 1, 1938.  M. D. FITZGERALD  2,134,868
GASKET
Filed Jan. 16, 1937  2 Sheets-Sheet 2

INVENTOR.
MARTIN D. FITZGERALD.
BY Joshua R. H. Potts
ATTORNEY.

Patented Nov. 1, 1938

2,134,868

UNITED STATES PATENT OFFICE 2,134,868

GASKET

Martin D. Fitzgerald, Torrington, Conn., assignor to Fitzgerald Manufacturing Company, Torrington, Conn., a corporation of Connecticut Application January 16, 1937, Serial No. 120,898

1 Claim. (Cl. 288—1)

This invention has to do with gaskets such as are commonly employed in conjunction with internal combustion engines, and the invention is concerned primarily with cylinder head and manifold gaskets.

A block and head of the type which is intended to be sealed by a cylinder head gasket in accordance with this invention ordinarily includes the cylinder openings and openings which define the water circulatory cooling system, and it is the edges of these openings which must be effectively sealed in order for the gasket to provide the desired results. While other openings are also included to accommodate the fastening bolts which maintain the head assembled on the block, the sealing of these openings is not of importance.

With the foregoing conditions in mind, this invention has in view as an important objective the provision of a cylinder head gasket of a novel type in which the structure of the gasket in the zones between the edges of the openings is maintained of a highly simplified nature, while a laminated and more flexible structure is provided around the edges of each of the openings which is to be sealed, so as to provide the desired sealing effects.

In carrying out this idea in a practical embodiment, this invention contemplates availing of a single sheet of metal as the main body of the gasket, and which sheet is formed with openings to correspond to the openings in the engine block and head. The edges of the cylinder and water openings are then grommeted to provide a laminated and flexible structure which may be compressed as the head is clamped to the block whereby a good seal along these edges is provided.

Inasmuch as it very often becomes necessary to restrict the size of the water openings in a cylinder head gasket, this invention has in view as a more detailed object the provision of a grommeted structure of a somewhat built-up nature, which is effective to obtain this desired result. This objective is achieved by providing a grommet for the water openings which projects radially into the openings, and which grommet is itself further grommeted to provide an opening of the desired size.

Various other more detailed objects and advantages such as arise in connection with carrying out the above noted objectives in different embodiments will in part become apparent, and in part be hereinafter stated, as the description of the invention proceeds.

The invention, therefore, comprises a gasket of the cylinder head or manifold type, in which the main body portion consists of a single sheet of metal, and which body portion is formed with openings that are provided with grommets, whereby yielding laminated structure is provided which may be compressed to afford the desired sealing effects.

Figure 2:
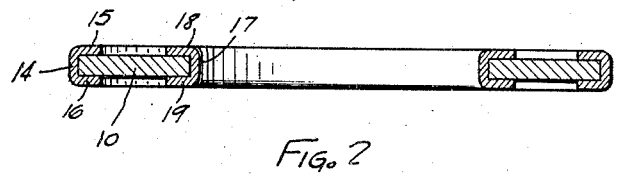
Figure 3:
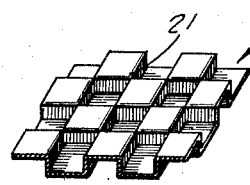
Figure 4:
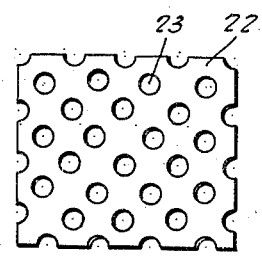
Figure 5:
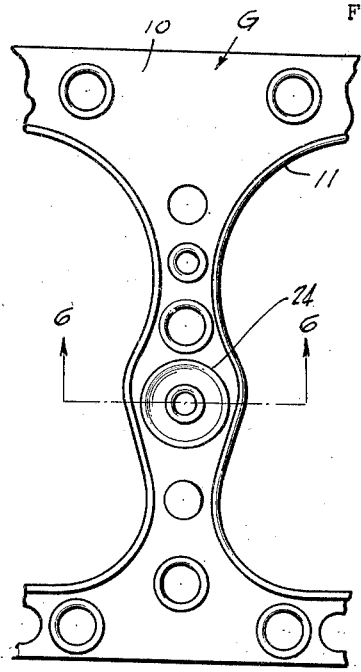
Figure 6:
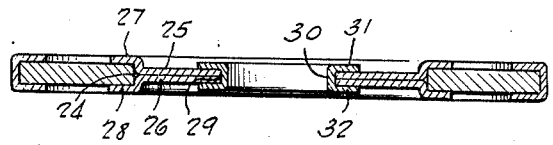
Figure 7:
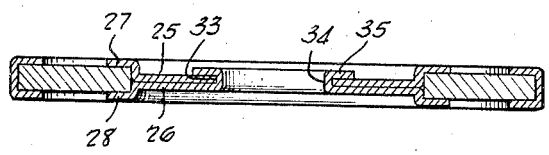
Figure 8:
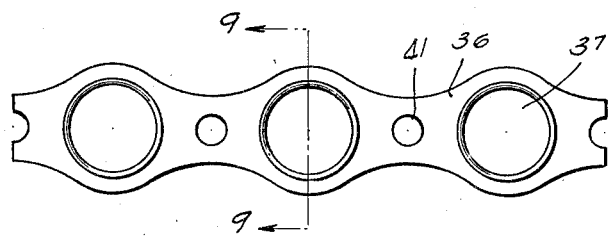
Figure 9:
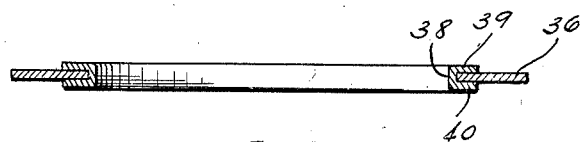

For a full and more complete understanding of the invention reference may be had to the following description and accompanying drawings, wherein Figure 1 is a plan view of a portion of a cylinder head gasket, made in acordance with the precepts of this invention, Figure 2 is an enlarged detailed section, taken about on the plane represented by the line 2—2 of Figure 1, Figure 3 is an enlarged detailed view in perspective, bringing out a material which may be employed as the main body of the gasket in one modification, while Figure 4 is a similar perspective showing bringing out the material of another modification, Figure 5 is a view similar to Figure 1 of a cylinder head gasket, in which the size of the water openings is to be restricted, Figure 6 is an enlarged detailed sectional view taken about on the plane represented by the line 6—6 of Figure 5, Figure 7 is a view similar to Figure 6, showing an alternative method of grommeting the restricted opening, Figure 8 is a plan view of a manifold gasket, and Figure 9 is an enlarged sectional view taken about on the plane represented by the line 9—9 of Figure 8.

Referring now to the drawings, wherein like reference characters denote corresponding parts, there is depicted in Figure 1 a portion of a cylinder head gasket which is referred to generally by the reference character G. In accordance with this invention the gasket G comprises a main body structure designated 10 which is formed with cylinder openings referred to as 11, and water openings identified as 12.

It will be noted that the main body structure 10 of the gasket is also provided with additional openings which are present for the purpose of accommodating bolts used in clamping the head to an engine block. However, it is the edges of the cylinder openings 11 and water openings 12 which of necessity must be sealed by the gasket G.

As shown in Figure 2, the main body structure 10 is preferably formed from a sheet of any appropriate metal, such as cold rolled steel or copper. The edges of the cylinder openings 11 are lined with grommets designated 14 which provide flanges 15 and 16 on each side of the body structure 10. Likewise, the water openings 12 are lined with grommets designated 17, which provide the flanges 18 and 19 on each side of the body structure 10.

It is evident that the grommets along the edges of each of the openings 11 and 12 provide a laminated structure which is susceptible of being compressed and deformed, as the gasket G is subject to the influence of being pressed between the head as it is being tightened on the block. As a result, the edges of the openings 11 and 12 are effectively sealed.

Referring now more particularly to Figure 3, a sheet of material identified as 20 is shown as being of a cross-corrugated construction; the corrugations being identified by the reference character 21. This material 20 may be availed of in lieu of the sheet metal identified as 10 in Figure 1. Similarly a sheet of perforated material shown at 22 in Figure 4 having perforations 23 may be employed as the main body structure of the gasket.

Referring now more particularly to Figure 5, it will be noted that the gasket G is provided with the usual cylinder openings 11, but the water opening shown at 24 is intended to be restricted in size. This is accomplished by first grommeting the edges of this opening 24 by the grommeted structure shown in section in Figure 6. This grommeted structure comprises upper and lower members 25 and 26 of duplicate construction. These members 25 and 26 are in abutting relationship within the opening 24, but have offset flanges 27 and 28 which overlie the body structure 10.

The abutting portions of the members 25 and 26 terminate in an edge 29 which substantially defines the size of the water opening. This edge 29 is again grommeted by the grommet member 30, which provides the flanges 31 and 32 in overlapping relationship with respect to the members 25 and 26.

It is evident that the flanges 31 and 32, together with the members 25 and 26 provide a laminated structure which is compressible and flexible in nature, and effective to thoroughly seal the water opening 24; the sealing effects being further enhanced by the presence of the laminated structure comprising flanges 27 and 28, and body member 10.

The same general idea developed by the structure of Figures 5 and 6 may be carried out in a somewhat different manner, as developed in Figure 7. In this view the lower grommet member 26 is extended inwardly and deformed up into the opening 33 formed in the upper grommet member 25. This turned-up portion of the lower grommet 26 is identified as 34, and the edges thereof are then turned outwardly into engagement with the upper grommet member 25; the flanged portion in such engagement being identified as 35. This structure 34 and 35 in effect provides a grommet which is integral with the lower grommet member 26.

Referring now more particularly to Figures 8 and 9, a manifold gasket is shown as comprising a main body portion 36 which may be made from a sheet of any appropriate metal, such as cold rolled steel or copper. This body member 36 is provided with openings 37 which must be sealed in order for the gasket to have the desired effects, the sealing effects being obtained by the grommet structure shown at 38 in Figure 9. This grommet 38 provides flanges 39 and 40 on each side of the body structure 37, which cooperate therewith to provide the laminated structure which may be compressed to provide the desired sealing effects.

As shown in Figure 8, the manifold gaskets 36 may be provided with openings 41 which are used in positioning the gaskets. Inasmuch as the edges of these openings need not be sealed, they are not grommeted.

While preferred specific embodiments of the invention are hereinbefore set forth, it is to be clearly understood that I am not to be limited to the exact constructions illustrated and described, because various modifications of these details may be provided in putting the invention into practice within the purview of the appended claim.

I claim:

A cylinder head gasket of the character described comprising a main body structure formed from a single piece of sheet metal, said body structure having a plurality of cylinder openings and an opening designed to accommodate the circulatory water system of an engine block, grommets lining the cylinder openings, a grommet structure lining the edge of said water opening, said last mentioned grommet structure consisting of two metallic layers, one layer being disposed on each side of the main body structure about the edge of the water opening to provide a laminated structure about the edge of said water opening, said layers extending into the water opening and in engagement with each other therein, and being formed with an opening of smaller radius than the water opening, and a grommet lining the edges of said last mentioned opening to provide a seal against the entry of water between said layers.

MARTIN D. FITZGERALD.